United States Patent
Bolgert et al.

(10) Patent No.: US 10,530,804 B2
(45) Date of Patent: *Jan. 7, 2020

(54) IDENTIFYING AND REMEDIATING MALWARE-COMPROMISED DEVICES

(71) Applicant: INTERNATIONAL BUSINESS MACHINES CORPORATION, Armonk, NY (US)

(72) Inventors: Anne L. Bolgert, Austin, TX (US); Richard J. Cohen, Austin, TX (US); Miguel Sang, Austin, TX (US); Krishna K. Yellepeddy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,558

(22) Filed: Oct. 4, 2018

(65) Prior Publication Data

US 2019/0036962 A1 Jan. 31, 2019

Related U.S. Application Data

(63) Continuation of application No. 15/703,073, filed on Sep. 13, 2017, now Pat. No. 10,164,998, which is a (Continued)

(51) Int. Cl.
*H04L 29/06* (2006.01)
*G06F 21/55* (2013.01)

(52) U.S. Cl.
CPC ........ *H04L 63/1433* (2013.01); *G06F 21/554* (2013.01); *H04L 63/145* (2013.01); *H04L 63/1416* (2013.01); *H04L 63/1425* (2013.01)

(58) Field of Classification Search
CPC ... G06F 21/56; G06F 21/554; H04L 63/1433; H04L 63/1416; H04L 63/1425; H04L 63/145
(Continued)

(56) References Cited

U.S. PATENT DOCUMENTS 8,782,792 B1 7/2014 Bodke
9,848,010 B2 12/2017 Bolgert et al.
(Continued)

OTHER PUBLICATIONS

Faghani et al., "Malware Propagation in Online Social Networks", Malicious and Unwanted Software (Malware), 2009 4th International Conference, Oct. 13-14, 2009; 7 Pages.
(Continued)

*Primary Examiner* — Yogesh Paliwal
(74) *Attorney, Agent, or Firm* — William Hartwell; Andrew D. Wright; Roberts Mlotkowski Safran Cole & Calderon, P.C.

(57) ABSTRACT

Systems and methods for identifying and remediating malware-compromised mobile devices are disclosed. A computer-implemented method includes accessing, by a computing device, malware risk data; determining, by the computing device, a mobile device is at risk from malware based on the malware risk data; identifying, by the computing device, a set of connections of a user of the mobile device, wherein each connection in the set of connections is associated with a user computer device; identifying, by the computing device, at least one user computer device from the set of connections at risk from the malware; and outputting, by the computer device, a malware notification for the mobile device at risk and at least one user computer device at risk.

20 Claims, 6 Drawing Sheets

Related U.S. Application Data continuation of application No. 14/950,022, filed on Nov. 24, 2015, now Pat. No. 9,848,010.

(58) Field of Classification Search
USPC .......................................................... 726/23
See application file for complete search history.

(56) References Cited

U.S. PATENT DOCUMENTS

| | | |
|---|---|---|
| 2006/0191012 A1 | 8/2006 | Banzhaf et al. |
| 2011/0145920 A1* | 6/2011 | Mahaffey ............. G06F 21/564 726/22 |
| 2012/0011077 A1 | 1/2012 | Bhagat |
| 2013/0219498 A1 | 8/2013 | Lee et al. |
| 2013/0268632 A1* | 10/2013 | Baron .................... H04L 67/02 709/219 |
| 2013/0332357 A1 | 12/2013 | Green et al. |
| 2015/0007331 A1* | 1/2015 | Pfeifer, Jr. .......... H04L 63/1433 726/25 |
| 2016/0344769 A1* | 11/2016 | Li ....................... H04L 67/2819 |
| 2017/0149815 A1 | 5/2017 | Bolgert et al. |
| 2018/0007080 A1 | 1/2018 | Bolgert et al. |

OTHER PUBLICATIONS

List of IBM Patents or Patent Applications Treated as Related 1 page, Oct. 3, 2018.
List of IBM Patents or Patent Applications Treated as Related, Nov. 12, 2019, 1 page.
Specification "Identifying and Remediating Malware-Compromised Devices" and Drawings in U.S. Appl. No. 16/667,055, filed Oct. 29, 2019, 38 pages.

* cited by examiner

IDENTIFYING AND REMEDIATING MALWARE-COMPROMISED DEVICES

BACKGROUND

The present invention relates generally to identifying malware-compromised devices and, more particularly, to methods and systems for pinpointing malware-compromised devices utilizing connections of a user.

Anti-malware scanners typically detect malware based on signatures or heuristics. A business may have a large number of internal mobile device users. The current approach to detecting malware is to run anti-malware software on the mobile devices that can detect and block known malware. The anti-malware software is typically updated on a fixed schedule with the aid of a mobile device management (MDM) system. This leaves a significant time period during which new malware could infect the mobile device, consequently causing data breaches or other attacks on the information technology assets of a business. Further, detecting malware utilizing an MDM system may not be feasible, such as for mobile device users who are external to a business (e.g., customers). A vulnerability on one mobile device can easily result in malware being propagated rapidly across different users and/or platforms, thereby potentially negatively impacting the business associated with those mobile devices (be the devices internal or external to the business). Thus, it is desirable to determine a faster way of identifying mobile devices that are infected with malware, and take corrective action.

SUMMARY

In an aspect of the invention, a computer-implemented method includes: accessing, by a computing device, malware risk data; determining, by the computing device, a mobile device is at risk from malware based on the malware risk data; identifying, by the computing device, a set of connections of a user of the mobile device, wherein each connection in the set of connections is associated with a user computer device; identifying, by the computing device, at least one user computer device from the set of connections at risk from the malware; and outputting, by the computer device, a malware notification for the mobile device at risk and the at least one user computer device at risk.

In aspects, the method further includes determining the mobile device is at risk from malware by receiving information from the mobile device during login, retrieving mobile device user data, and identifying that the mobile device is at risk from malware based on the mobile device user data. Determining the mobile device is at risk may include the steps of accessing information regarding the mobile device stored in a user database or directly from the mobile device, and determining, based on the information, that the mobile device is utilizing an application identified as being at risk from malware. In embodiments, the method may further include ranking the set of connections of the user of the mobile device using a set of weighted parameters, and identifying a subset of the set of connections having a risk level greater than or equal to a predetermined risk level based on the ranking. The parameters may include: 1) the riskiness of an application used by a connection, wherein the riskiness of the application is positively correlated with a security risk, 2) the reputation of one or more social media applications being used by the connection, and/or 3) detected anomalies in activities within a social media network of the user of the mobile device.

In another aspect of the invention, there is a computer program product for identifying malware-compromised mobile devices. The computer program product comprises a computer readable storage medium having program instructions embodied therewith, the program instructions executable by a computing device to cause the computing device to: access, by the computing device, malware risk data via a network connection; determine, by the computing device, the mobile device is at risk from malware based on the malware risk data; identify, by the computing device, a set of connections of a user of the mobile device; identify, by the computing device, at least one other user from the set of connections at risk from the malware; and issue, by the computing device through a network connection, a notification of malware risk to the user of the mobile device and the at least one other user from the set of connections at risk from malware. The program instructions may further cause the computing device to receive information from the mobile device during login, retrieve mobile device user data, and identify that the mobile device is at risk from malware based on the mobile device user data. The program instructions may cause the computing device to access information regarding the mobile device stored in a user database or directly from the mobile device, and determine, based on the information, that the mobile device is utilizing an application identified as being at risk from malware.

In embodiments, program instructions cause the computing device to rank the set of connections using a set of weighted parameters, and identify a subset of the set of connections having a risk level greater or equal to a predetermined risk level based on the ranking. The parameters may include: 1) the riskiness of an application used by a connection, wherein the riskiness of the application is positively correlated with a security risk, 2) the reputation of one or more social media applications being used by the connection, and/or 3) detected anomalies in activities within a social media network of the user of the mobile device, 4) the level of current, known vulnerabilities for the mobile device and a device of the at least one other user.

In another aspect of the invention, there is a system for identifying malware-compromised personal computing devices. The system includes a CPU, a computer readable memory and a computer readable storage medium associated with a computing device, program instructions to access malware risk data, program instructions to determine the personal computing device is at risk from malware based on the malware risk data, program instructions to identify a set of connections of a user of the personal computing device, wherein each connection in the set of connections is associated with a user device, program instructions to identify at least one user device from the set of connections at risk from the malware, and program instructions to implement malware remediation steps to remove the malware from the personal computing device at risk from malware. The program instructions are stored on the computer readable storage medium for execution by the CPU via the computer readable memory.

Additionally, program instructions may be provided to rank the set of connections using a set of weighted parameters, identify a subset of the set of connections having a risk level greater or equal to a predetermined risk level based on the ranking, and implement malware remediation steps to remove malware from user devices associated with each of the connections of the subset. The parameters may include 1) the riskiness of an application used by a connection, wherein the riskiness of the application is positively correlated with a security risk, 2) the reputation of one or more social media applications being used by the connection, and/or 3) detected anomalies in activities within a social media network of the user of the mobile device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
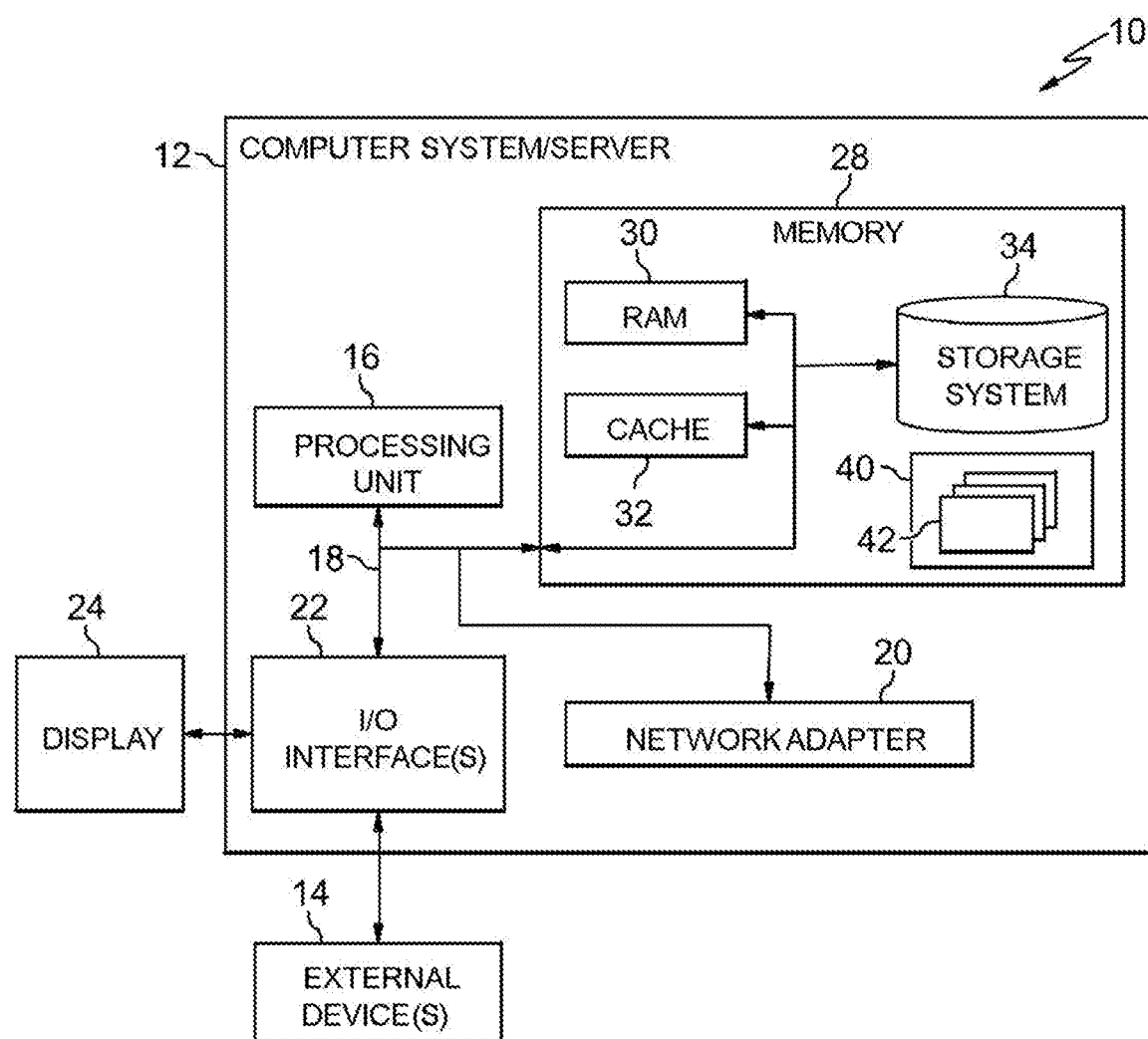
FIG. 1 depicts a computing infrastructure according to an embodiment of the present invention.

The present invention relates generally to computer-based identification of malware-compromised devices. Implementations of the present invention can be used by business enterprises for pinpoint targeting of potentially compromised mobile devices and other personal computing devices in a business environment based on a user's contacts. In embodiments, anti-malware software detects that an application on a first user's mobile device is infected or is actually malware and should be removed. The business places this application on a blacklist. The business then proceeds to remove the malware at issue from all mobile devices in their environment, starting with mobile devices most likely to be infected. Mobile devices most likely to be infected are identified by first identifying the first user's connections (i.e., social circle) at work using his or her instant message list of friends, internal business connections, contact list, etc. A subset of the social circle, or hot connection list, can be determined by identifying the contacts that the first user most actively interacts with from the overall social circle contact list. In embodiments, message content is not viewed; only data on interaction activity is utilized to generate a list of potentially compromised devices. For each active connection in the first user's list, the business repeats the identifying step a configurable number of times to generate a set of all potentially compromised devices in the business environment to disinfect first. The process described herein may be performed on an as-needed basis in addition to regular checks businesses already have in place; namely, periodic checks on all devices in order to ensure that there are no blacklisted apps on the devices.

In embodiments, a business will analyze the connections of mobile devices external to the business. Most existing solutions consist of Mobile Device Management (MDM) systems that directly manage devices. The present invention enables identification of potentially compromised mobile devices that are not managed by a MDM system, and notification of the users of the mobile devices. It can be understood that embodiments of the invention enable proactive identification of mobile and other device users that are at high risk of needing remediation and notification. This technological solution provides a mechanism for decentralized remediation. This proactive approach means a smaller subset of the universe of a billion+ computer devices in the case of a social networking provider getting infected with malware and pinpoint remediation of those devices that get infected.

In embodiments, a hot connection list of social connections of the first user is compiled based on the networks the first user is active in, and identifying the most active social connections for the first user. This hot connection list may be generated based on the most recent active interactions between the first user and others in his or her social network. The time period for observing "recent" activity can be configured to a day, week, or month, as desired. By way of example, a social network provider provides a software development kit (SDK), which enables identification of the most active friend interactions for a user based on comments or likes for a posting by the user. If malware is detected on the first user's mobile device, malware alerts can be sent out via email and short message service (SMS) to the hot connection list of the first user. Optionally, for the top 10% of active connections for each user in the first user's hot connection list, the identification steps can be repeated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
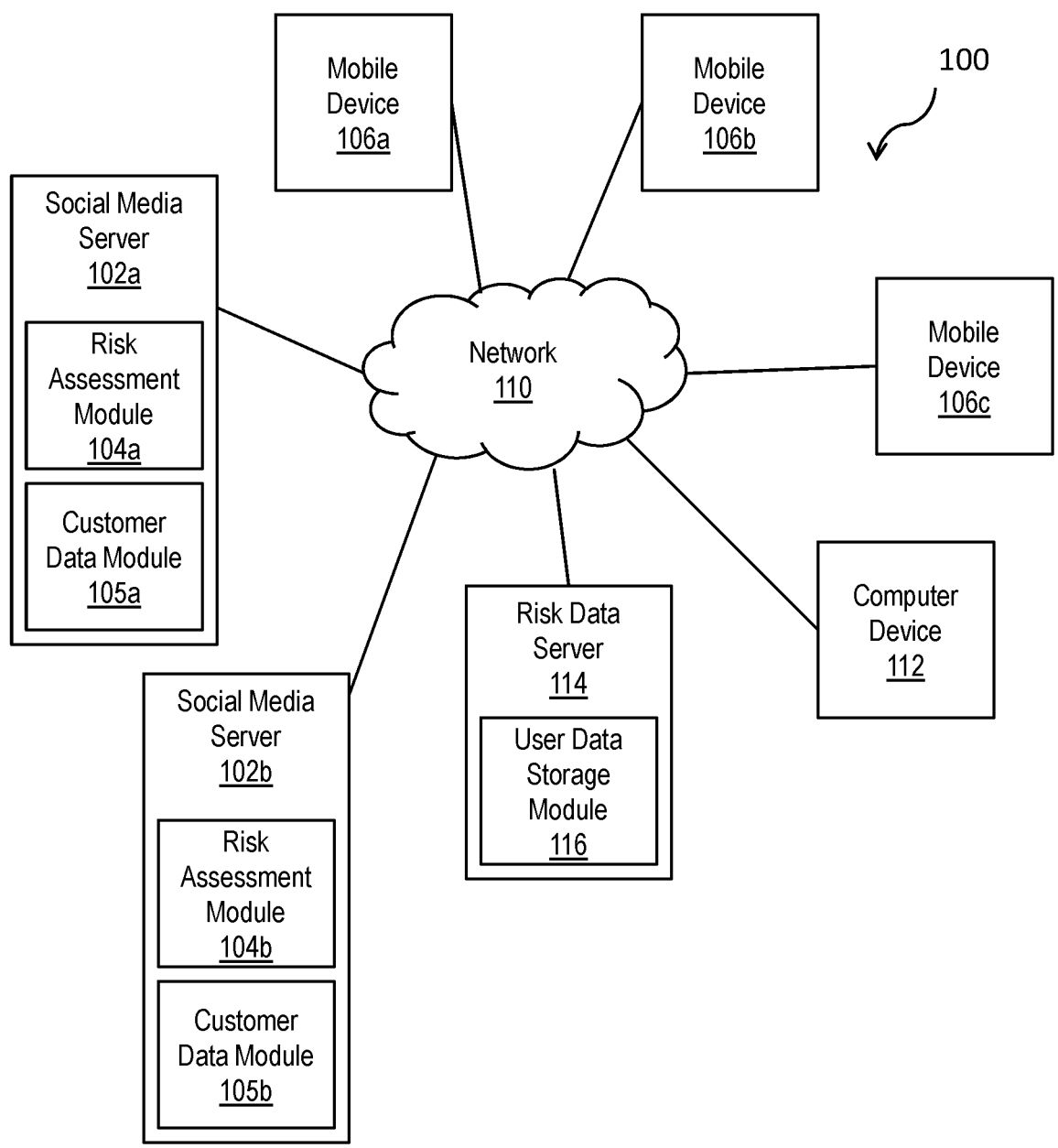
FIG. 2 shows an exemplary environment in accordance with aspects of the invention.

FIG. 2 shows an exemplary system 100 for identifying malware-compromised mobile devices in a social media environment in accordance with aspects of the invention. The environment includes a plurality of social media servers represented by social media servers 102a and 102b. Each social media server includes a respective risk assessment module 104a, 104b and customer data modules 105a, 105b, enabling the identification of malware-compromised mobile devices in accordance with methods of the invention. It should be understood that social media servers may each be in the form of computer system 12 of FIG. 1, and modules 104a, 104b, 105a and 105b may be program modules 42. Social media servers 102a, 102b are connected to a plurality of mobile devices, represented by 106a, 106b and 106c, via a network 110. Mobile devices 106a, 106b, 106c may be any type of mobile computing device, such as a smart phone, a personal digital assistant, a tablet computer, a laptop computer, or the like. Social media servers 102a, 102b may also be connected to other personal computing devices such as personal desktop computers, represented by computer device 112, through network 110. It should be understood that any number of social media servers can be connected to any number of mobile devices or other computer devices in accordance with the invention. In embodiments, a remote risk data server 114 is in communication with social media servers 102a, 102b via network 110, in order to supply social media servers 102a, 102b with malware risk data. Remote risk data server 114 may include a user data storage module 116, for collecting and storing limited user data received by one or more social media servers 102a, 102b.

In embodiments, each social media server 102a, 102b includes or is in communication with a respective risk assessment module 104a, 104b for implementing malware-compromised device identification software. Each social media server 102a, 102b may also include or be in communication with a respective customer data module 105a, 105b, which stores customer information. Customer information stored in data modules 105a, 105b can include, for example, users' contact lists, historic social media use and communication information (e.g., which contacts a user has communicated with the most within a certain time period), and mobile device data (e.g., type of smart phone and type of operating system utilized by the smart phone).

In embodiments, social media servers 102a, 102b obtain up-to-date malware risk data from risk data server 114, which may be operated by a third party provider. Malware risk data can include, for example, the latest malware and devices and/or operating systems that are vulnerable to the malware. In embodiments, risk data server 114 includes user data storage module 116 for storing limited user data. In aspects of the invention, limited user data stored in data storage module 116 can be accessed by multiple social media servers (e.g., 102a, 102b) in order to share information related to the spread of malware. For example, if social media server 102a determines that a mobile device 106a is at risk from malware, it can send limited user data associated with mobile device 106a to risk data server 114 for storage in user data storage module 116. Social media server 102b can access this limited social media user data and take steps to address the potential spread of malware from mobile device 106a to other devices, utilizing the malware-compromised device identification methods of the present invention.

Figure 3:
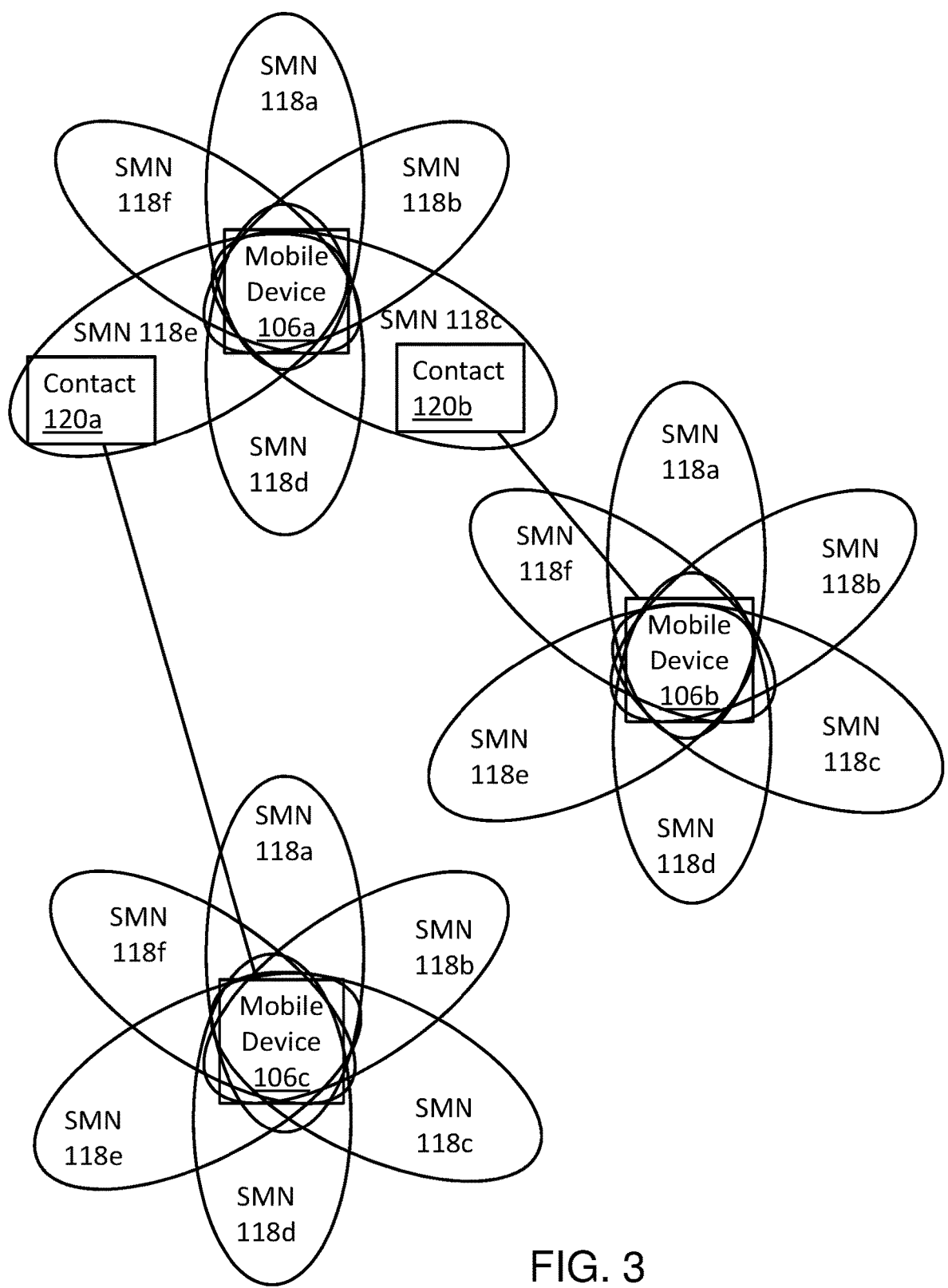
FIG. 3 depicts social media connections between mobile devices in accordance with aspects of the invention.

FIG. 3 depicts exemplary social media network (SMN) connections of the plurality of mobile devices 106a, 106b, and 106c in system 100. Each user of mobile devices 106a, 106b, 106c, may participate in a plurality of SMNs, represented by SMNs 118a-118f. An SMN may be any computer-mediated tool that allows users to create and exchange user-generated content through the internet. Each mobile device user, for example 106a, has one or more connections (e.g., social media contacts), represented by 120a and 120b. In a typical scenario, each contact 120a, 120b, in turn, participates in a plurality of SMNs (e.g., 118a-118f) through respective mobile devices 106b, 106c. SMNs of the users of mobile devices 106b, 106c may be the same or different from SMNs of the user of mobile device 106a. In today's online environment, where a single mobile device user can be wirelessly connected to hundreds or even thousands of other mobile device user's through SMNs, malware contamination of the user's mobile device (e.g., 106a for example) could easily spread to others' mobile devices (e.g., 106b and 106c) through communications between the mobile devices themselves and indirectly through communication with a SMN. In turn, contamination of mobile devices 106b and 106c can spread to mobile devices of their users' connections (not depicted). The present invention addresses the challenge of remediating and stopping the spread of malware contamination of computer devices distributed across vast, geographically diverse, interconnecting networks of users.

Figure 4:
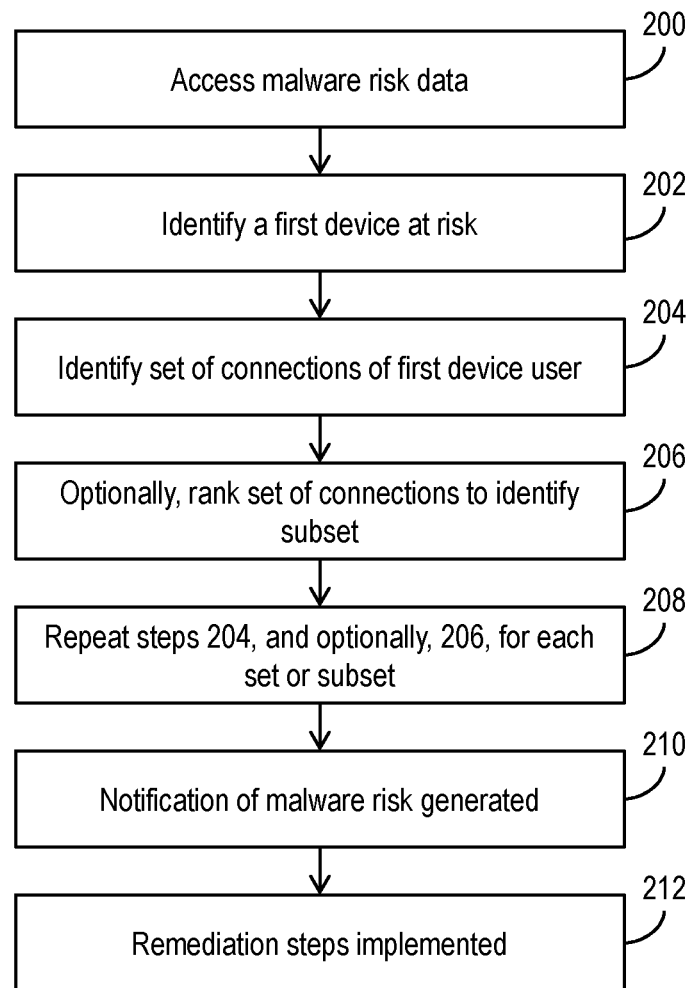
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIG. 2, and are described with reference to elements shown in FIG. 2. At step 200 a social media server (e.g., 102a, 102b) accesses malware risk data. By way of example, social media server 102a may subscribe to intelligence feeds from a risk data server 114 of a third party provider. Risk data server 114 preferably contains up-to-date malware information, including particular mobile applications of concern, as well as vulnerable device information. Alternatively, risk data server 114 can be maintained by a social media server (e.g., 102a, 102b), and the social media server can construct risk data from any available sources.

At step 202, a risk assessment module (e.g., 104a, 104b) identifies a first device at risk based on a trigger event. A trigger event may occur when the risk assessment module identifies that a user's mobile device is utilizing an application known to be at risk (e.g., malware), or is a make or model identified as being at risk from malware, based on risk data obtained from risk data server 114. In one example, when a first user logs into a social media server 102a of SMN 118a, risk assessment module 104a identifies the first user's mobile device 106a by using user-agent information sent back in the header as part of the http protocol (rfc 2616). Social media server 102a can then determine whether to serve up a page tailored to the specific mobile device 106a. Similarly, social media server 102a can determine what browser is being used based on the user-agent information. If the version or type of browser used by mobile device 106a is not supported by social media server 102a, social media server 102a will send a warning that the browser is not supported and will recommend an alternative browser to use. This user device information can then be stored in the customer data module 105a of social media server 102a as part of the profile of a user without use of an MDM. Additionally, social media server 102a may allow a user to register a device (e.g., mobile device 106a) they are logging in from. When a user logs in to social media server 102a, social media server 102a can access stored user device information in customer data module 105a to determine if the particular device used is at risk from malware, based on malware data obtained from risk data server 114. If a user logs in from a device that is not part of the profile or part of a user's registered device list, a step-up authentication or other security measure may be implemented.

In embodiments, a social media server (e.g., 102a, 102b) is configured to notify the user of a mobile device 106a with a particular operating system based on vulnerabilities regarding the operating system having been recorded in risk data server 114, optionally down to the granularity of the specific versions of a mobile application being used. The social media server would not have access at this granularity for users in an environment outside the social media server unless there is cross-sharing of information by different social media providers. To this end, in embodiments, the invention enables sharing of limited customer mobile device data through risk data server 114. More specifically, social media servers (e.g., 102a, 102b) may communicate limited customer mobile device data to risk data server 114 to be stored in user data storage module 116. In embodiments, limited customer mobile device data includes only information relevant to a malware risk analysis, and does not include specific message content information. The mobile device data in module 116 may then be accessed by participating SMNs in order to correlate user information with others with specific devices to more clearly identify potential devices at risk from malware.

In step 204, a set of connections (e.g., contacts 120a, 120b of FIG. 3) of the first device user (e.g., mobile device 106a) is identified by a risk assessment module (e.g., 104a) of a social media server (e.g., 102a). The set of connections can be based on a friends list, or other contact information stored in an associated customer data module (e.g., 105a). Optionally, at step 206, the set of connections of a user are ranked by a risk assessment module using weighted parameters to determine an overall risk score in order to create a subset (i.e., hot list) of connections. The subset may contain connections having a risk score at or above a predetermined risk threshold. The subset of connections may be pinpointed based on a plurality of weighted parameters. For example, the applications used by the connection may be evaluated and for applications that are deemed to be risky, the risk score is increased. The reputation of a SMN may be used to determine whether to examine the first device user's connections, and to what depth. The depth to which connections are searched is also configurable, as will be discussed in more detail below. Additionally, a risk assessment module, such as 104a, can detect anomalies in the activities of a user. For example, historic user data in customer data module 105a can be accessed by risk assessment module 104a, and if the data indicates that the number of users "followed" by a particular SMN user suddenly spikes, or the number of "likes", "friends" or "follows" suddenly spikes, a higher risk score may be assigned. Further, connections that are most likely to be infected may be identified based on the most active connections of a user, such as the connections most recently contacted and/or most often contacted by a user, and assigned a higher risk score.

In embodiments, the invention takes into account the multiple devices of a user logging into an SMN to evaluate overall risk of a user. Logging in from both an ultra-safe and ultra-risky device and/or environment would result in a user being assigned a higher risk (e.g., a user logging in from both a mobile device and a computer desktop device) by the risk assessment module (e.g., 105a, 105b). In other words, the risk level of a user may be based on the riskiness of a mobile device of a user and another computer device of the user, where the riskiness is positively correlated with security risks of both devices. Vulnerability on one device can easily result in malware being propagated rapidly across different platforms.

At step 208, steps 204 and 206 may be repeated by the risk assessment module (e.g., 104a, 104b) for each set or subset of connections identified as being at risk, to determine additional sets or subsets of connections at risk from malware. As noted above, the depth to which connections are searched is configurable, and step 208 may be repeated any desired number of times for each additional set or subset of connections identified. The number of times step 208 is repeated may be based on the risk score of a particular mobile device user determined at step 206, for example.

At step 210, a notification of malware risk is generated (outputted) by the risk assessment module for the first device at risk and the set or subset of connections. Using pinpointed targeting of the present invention, a SMN can alert their users to take remediation steps such as run vulnerability scans tailored for the specific devices they are logged in from or require step-up verification. In embodiments, step-up verification may include a social media server (e.g., 102a) requiring a user to demonstrate their knowledge of details of close friends in the set or subset of connections. The notification may be an active notification, such as an email issued over the internet by an SMN, or a "lazy" notification, such as a message which is presented to a user via the internet upon login of the user to the SMN through a social media server (e.g., 102a, 102b). Optionally, at step 212, remediation steps are implemented by a social media server (e.g., 102a) after a user receives the notification of malware risk generated at step 210. The first device user and/or the set or subset of connections may be prompted to run one or more vulnerability scans by social media server 102a, and may be prevented from using an application until a scan has been run and remediation completed. It should be appreciated that, where MDM is not feasible, the present invention provides a way of ensuring that users are prompted to run vulnerability scans, and potentially not allowed to use an application until a scan has been run and remediation completed. SMNs are a good example of an environment where MDM is not feasible.

Figure 5:
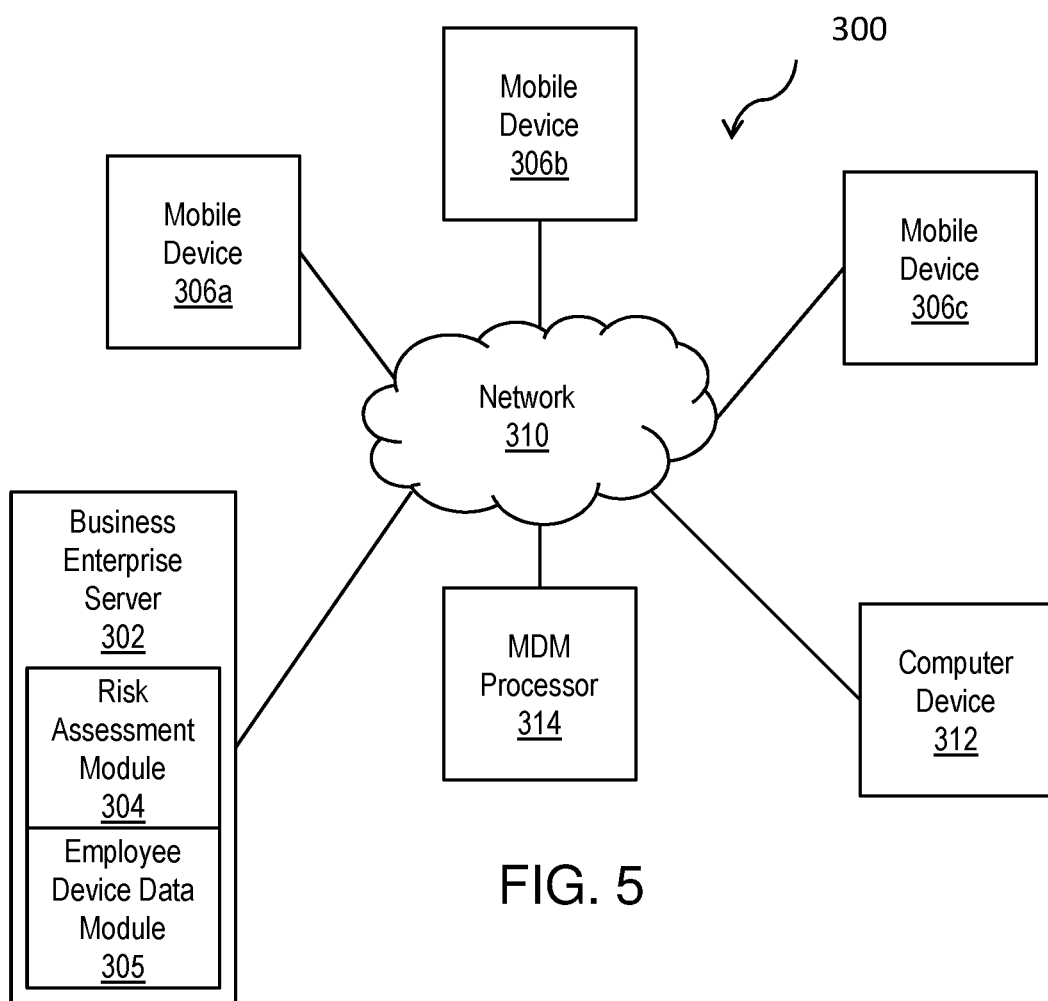
FIG. 5 shows another exemplary environment in accordance with aspects of the invention.

FIG. 5 will now be referenced with respect to an exemplary system 300 for identifying malware-compromised mobile and other devices in an internal business enterprise environment in accordance with aspects of the invention. The environment includes at least one business enterprise server 302. The at least one business enterprise server 302 includes a risk assessment module 304 and an employee device data module 305, enabling the identification of malware-compromised mobile devices and other personal computing devices in accordance with methods of the invention. Employee device data module 305 includes device data for employees, such as software installed on the devices, operating systems used, and the like. It should be understood that business enterprise server 302 may be in the form of computer system 12 of FIG. 1, and risk assessment module 304 may be one or more program modules 42. Business enterprise server 302 is connected to a plurality of mobile devices, represented by 306a, 306b and 306c, via a network 310. Network 310 may be a cloud-based network as depicted, or an internal network. Mobile devices 306a, 306b, 306c may be any type of mobile computing device, such as a smart phone, a personal digital assistant, a tablet computer, a laptop computer, or the like. Business enterprise server 302 may also be connected to other computer devices such as personal desktop computers, represented by computer device 312, through network 310. Optionally, a MDM processor 314 configured to implement mobile device management software is in communication with business enterprise server 302, either directly or via network 310. In embodiments, employee device data module 305 may be incorporated in MDM processor 314.

Figure 6:
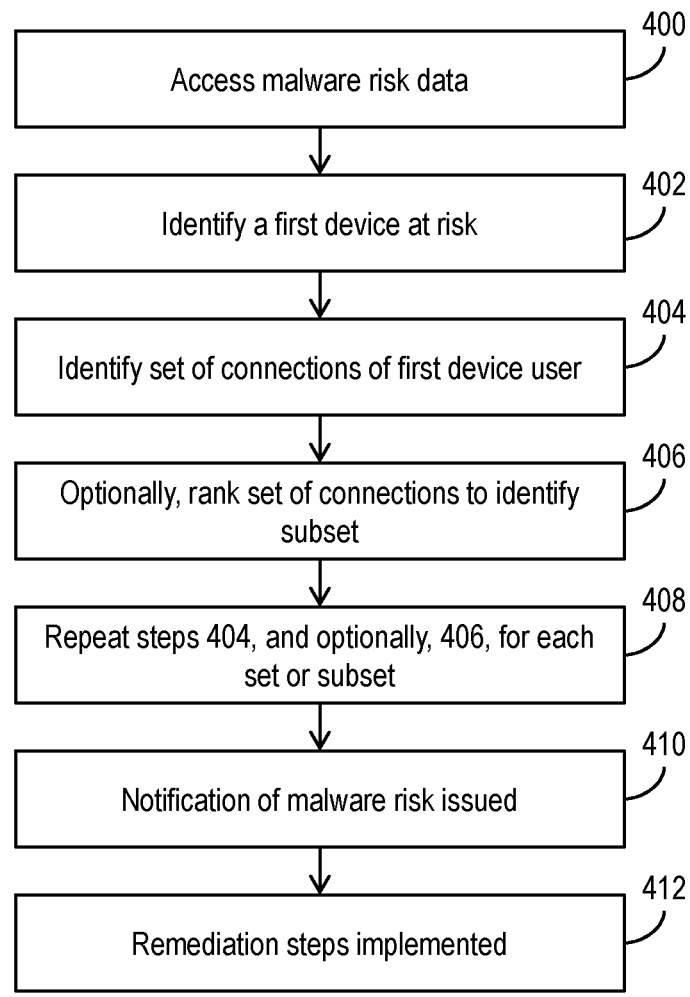
FIG. 6 shows a flowchart of steps of a method in accordance with aspects of the invention.

FIG. 6 shows a flow chart of steps of a method in accordance with aspects of the invention. Steps of the method of FIG. 6 may be performed in the environment illustrated in FIG. 5, and will now be described with reference to elements shown in FIG. 5. At step 400 server 302 accesses malware risk data. Malware risk data can be in the form of anti-malware software.

At step 402, risk assessment module 304 identifies a first business device at risk based on a trigger event. By way of example, a trigger event may occur when anti-malware software run on a mobile device 306a detects that a mobile application on the device is infected or is actually malware and should be removed. Anti-malware software may be implemented as part of a MDM program. The mobile application identified as malware may then be placed on a black list.

At step 404, a set of connections (i.e., inter-enterprise connections) of the first business device user (e.g., mobile device 106a identified in step 402) is identified. The set of connections can be based on email exchanges, instant message exchanges, or other inter-enterprise contact information. Optionally, at step 406, the set of connections of a user are ranked using weighted parameters to determine an overall risk score in order to create a subset of connections. The subset (hot list) of connections may be pinpointed based on the plurality of weighted parameters. For example, connections that are "most likely" to be infected may be identified by risk assessment module 304 based on user data stored in employee device data module 305, such as the most active connections of a user, or the connections most recently contacted and/or most often contacted by a user. These connections "most likely" to be infected are then assigned a higher risk score by risk assessment module 304. The subset may contain connections having a risk score at or above a predetermined risk threshold. For example, the top 10% of a user's active connections could be identified as a subset.

At step 408, steps 404 and 406 may be repeated for each set or subset of connection identified as being at risk by risk assessment module 304. As noted above, the depth to which connections are searched is configurable, and step 408 may be repeated any desired number of times for each additional set or subset of connections identified. The number of times step 408 is repeated may be based on the risk score of a particular mobile device user determined at step 406, for example.

At step 410, the first business device user and/or the set or subset of connections are notified of a potential malware risk by server 302, and are instructed to proceed with remediation steps. Accordingly, at step 412, remediation steps are implemented by a user of a device at risk (e.g., the first business device at risk and devices of the set or subset of connections), or by the business enterprise, such as through business enterprise server 302 or MDM processor 314. Remediation steps can be any anti-malware remediation techniques, including running anti-malware software on the device at risk. Although discussed with reference to mobile devices in particular, it should be understood that other devices within a network may be evaluated using the methods described above.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for identifying malware-compromised devices. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, by a computing device, a mobile device at risk from malware;
   ranking, by the computing device, a set of connections of a user of the mobile device using a set of weighted parameters;
   identifying, by the computing device, a subset of the set of connections having a risk level greater than or equal to a predetermined risk level based on the ranking; and
   outputting, by the computing device, a malware notification for the mobile device at risk and at least one user computer device from the set of connections at risk from the malware.

2. The computer-implemented method of claim 1, wherein outputting the malware notification comprises outputting the malware notification to at least one user computer device of the subset of the set of connections.

3. The computer-implemented method of claim 1, further comprising identifying, by the computing device, the set of connections of the user of the mobile device, wherein each connection in the set of connections is associated with a user computer device.

4. The computer-implemented method of claim 3, wherein the set of connections are social media connections.

5. The computer-implemented method of claim 3, wherein the set of connections are inter-enterprise connections.

6. The computer-implemented method of claim 1, further comprising identifying a type of the mobile device.

7. The computer-implemented method of claim 6, wherein the identifying the type of the mobile device comprises identifying one of the group consisting of: a make of the mobile device, and a model of the mobile device.

8. The computer-implemented method of claim 6, wherein the identifying the type of the mobile device comprises identifying the type of the mobile device from user-agent information received from the mobile device during a login event.

9. The computer-implemented method of claim 8, further comprising:
   determining, by the computing device, a type of browser used by the mobile device based on the user-agent information; and
   determining, by the computing device, whether the browser used by the mobile device is supported by the computing device.

10. The computer-implemented method of claim 1, further comprising accessing malware risk data, wherein the accessing the malware risk data comprises accessing the malware risk data in a remote risk data server through a network.

11. The computer-implemented method of claim 1, wherein the malware risk data comprises anti-virus software.

12. The computer-implemented method of claim 1, wherein the parameters comprise at least one of:
   riskiness of an application used by a connection, wherein the riskiness of the application is positively correlated with a security risk;
   the reputation of one or more social media applications being used by the connection; and
   detected anomalies in activities within a social media network of the user of the mobile device.

13. The computer-implemented method of claim 1, wherein the risk level is based on riskiness of at least one computer device of the user of the mobile device and the mobile device, wherein the riskiness is positively correlated with a security risk.

14. The computer-implemented method of claim 1, wherein the malware notification includes remediation instructions.

15. A computer program product comprising a computer readable storage medium having program instructions embodied therewith, the program instructions executable by a computing device to cause the computing device to:
   identify a mobile device at risk from malware based on a type of the mobile device matching one or more types of devices identified as being at risk from the malware;
   rank a set of connections of a user of the mobile device using a set of weighted parameters;
   identify a subset of the set of connections having a risk level greater than or equal to a predetermined risk level based on the ranking; and
   output a malware notification for the mobile device at risk and at least one user computer device from the set of connections at risk from the malware.

16. The computer program product of claim 15, wherein the parameters comprise at least one of:
   riskiness of an application used by a connection, wherein the riskiness of the application is positively correlated with a security risk;
   the reputation of one or more social media applications being used by the connection;
   detected anomalies in activities within a social media network of the user of the mobile device; and
   a level of current, known vulnerabilities for the mobile device and a device of the at least one other user.

17. The computer program product of claim 15, wherein the risk level is based on riskiness of at least one computer device of the user of the mobile device and the mobile device, wherein the riskiness is positively correlated with a security risk.

18. A system comprising:
   a CPU, a computer readable memory and a computer readable storage medium associated with a computing device;

program instructions to determine a personal computing device is at risk from malware based on the malware risk data;

program instructions to identify a set of connections of a user of the personal computing device, wherein each connection in the set of connections is associated with a user device;

program instructions to rank the set of connections using a set of weighted parameters;

program instructions to identify a subset of the set of connections having a risk level greater or equal to a predetermined risk level based on the ranking; and program instructions to send a notification regarding malware remediation steps to the personal computing device and at least one user device of the set of connections of the user, wherein the program instructions are stored on the computer readable storage medium for execution by the CPU via the computer readable memory.

19. The system of claim 18, wherein the malware remediation steps are selected from the group consisting of: running a vulnerability scan, and performing a step-up verification.

20. The system of claim 18, wherein the parameters comprise at least one of:

riskiness of an application used by one of the sets of connections, wherein the riskiness of the application is positively correlated with a security risk;

the reputation of one or more social media applications being used by the one of the sets of connection; and detected anomalies in activities within a social media network of the user of the personal computing device.

* * * * *